UnitedStates Patent Office 3,428,600
Patented Feb. 18, 1969

3,428,600
CARBONATE POLYMER SYNTHESIS
Robert C. Sullivan, Chappaqua, N.Y., and Markus Matzner, Highland Park, N.J., assignors to Union Carbide Corporation, a corporation of New York
No Drawing. Filed June 18, 1965, Ser. No. 465,183
U.S. Cl. 260—47                10 Claims
Int. Cl. C08g 17/13

ABSTRACT OF THE DISCLOSURE

In the preparation of carbonate polymer resin by the reaction of a diol reactant with a difunctional chloroformate reactant the improvement of conducting the reaction in the presence of a particulate insoluble solid resin containing in its structure the moiety

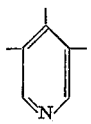

wherein the resin is present in the reaction in an amount at least sufficient to bind the acid generated by the polymerization reaction.

---

The present invention relates to a new and improved synthesis of carbonate polymers. More particularly, this invention relates to a method of producing carbonate polymers in the presence of a catalyst system which is fully recoverable, non-contaminating, and which does not yield reactive products which produce side reactions.

The preparation of carbonate polymers by the direct phosgenation of a diol or polyhydric phenol has long been known in the art. Such preparations have been hindered by the fact that low molecular weight carbonate polymers are produced unless a catalyst system is provided. While proposals to utilize chloroformate reactants as a substitute for phosgene have been made such reactants have also been found to require catalyst systems in order to provide carbonate polymers of relatively high molecular weight.

A catalyst system for this reaction must be capable of reacting with and binding the free hydrochloric acid which is generated by the polymerization reaction, but ideally should not react with the phosgene, or chloroformate or the diol or polyhydric phenol reactant. The catalyst systems proposed have included metal hydroxides which tend to react with the phosgene reactant and also cause separation problems relative to the polymer product.

Proposed hydroxide charged ion exchange resins react effectively with the hydrochloric acid to bind it in the reaction system and is readily removed from the reaction mixture at the end of the reaction. This system however, by the very mechanism which binds the generated chloride ion, generates water which is reactive with both phosgene and chloroformate. This generated water then competes for reactants and reduces reaction efficiency.

Pyridine catalyst systems and sterically unhindered pyridine analog catalyst systems have been found to provide optimum catalyst especially when used in large excess over the equivalent amount necessary to bind the hydrochloric acid generated. These catalyst systems however while highly effective are costly to use. Being liquid they must be distilled from the polymer product mixture resulting in catalyst loss and reduced efficiency. Until the present time no effective catalyst system has been proposed which would overcome the deficiencies indicated above.

In accordance with this invention it is provided that carbonate polymers be produced by the reaction of a diol reactant including polyhydric phenols by reaction with phosgene or a dichloroformate in the presence of a linear organic resin containing the catalytic moiety:

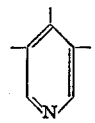

By the term diol reactant is meant those aliphatic cycloaliphatic and aromatic diols which are used in the preparation of linear carbonate polymers. Included within the term diol reactants are the glycols such as ethylene glycol, diethylene glycol, triethylene glycol, propylene glycol and the like; the aliphatic diols other than the glycols such as 1,3-propane diol, 1,4-butane diol, 2,3-butane diol, 1,3-butanediol, 1,5-pentane diol, 2,4-pentane diol, 1,6-hexane diol, 3,4-hexane diol and the like; the cycloaliphatic diols such as cyclobutane diol, the 2,2,4,4-tetraalkyl substituted cyclobutane diols such as 2,2,4,4-tetramethylcyclobutanediol-1,3; cyclohexanediol, cyclohexane dimethanol, cyclohexane diethanol and the like; aryl diols such as resorcinol,
catechol,
4,4'-dihydroxydiphenylmethane,
4,4'-dihydroxy-1,1-diphenylethane,
4,4'-dihydroxy-1,1-diphenyl-n-butane,
4,4'-dihydroxy-1,1-diphenylheptane,
4,4'-dihydroxydiphenylphenylmethane,
4,4'-dihydroxy-2,2-diphenylpropane,
4,4'-dihydroxy-3,3'-dimethyl-2,2-diphenylpropane,
4,4'-dihydroxy,3,3'-diphenyl-2,2-diphenylpropane,
4,4'-dihydroxy-3,3'-dichloro-2,2-diphenylpropane,
4,4'-dihydroxy-2,2-diphenylbutane,
4,4'-dihydroxy-2,2-diphenylpentane,
4,4'-dihydroxydiphenylmethylisobutylmethane,
4,4'-dihydroxy-2,2-diphenylheptane,
4,4'-dihydroxy,2,2-diphenyloctane,
4,4'-dihydroxy-3,3-diphenylpentane,
4,4'-dihydroxy-4,4-diphenyl-n-heptane,
4,4'-dihydroxy-1,1-diphenylcyclopentane,
4,4'-dihydroxy-1,1-diphenylcyclohexane,
4,4'-dihydroxydiphenylmethylphenylmethane,
4,4'-dihydroxydiphenylethylphenylmethane,
4,4'-dihydroxy-1-diphenyl-(2,2,2-trichloro)ethane,
4,4'-dihydroxy-3-methyl-2,2-diphenylpropane,
4,4'-dihydroxy-3,3'-diethyl-2,2-diphenylpropane,
4,4'-dihydroxy-3,3'-diisopropyl-2,2-diphenyl propane,
4,4'-dihydroxy-3,3',5,5'-tetrachloro-2,2-diphenylpropane,
4,4'-dihydroxy-3,3'-dicyclohexyl-2,2-diphenylpropane,
4,4'-dihydroxydiphenylisobutylmethane,
4,4'-dihydroxy-2,2-diphenyl-n-nonane,
4,4'-dihydroxy-β,β-diphenyldecalin, and the like.

Phosgene is used as exemplary herein and it is to be understood that bromophosgene and iodophosgene can similarly be used if desired.

Chloroformate reactants can be prepared by the partial reaction of phosgene with a diol reactant, as illustrated above, wherein the phosgene is present in excess.

By the term pyridine containing organic resin is meant those polymers containing within their structure the moiety:

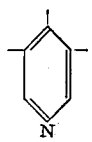

Preferably these resins are linear in nature although crosslinked resins can be used provided the unhindered heterocyclic nitrogen of the pyridine moiety is not affected by the crosslinking mechanism. Similarly these resins should desirably contain the pyridine moiety as a predominant structure in the repeating unit of the polymer in order to provide a high degree of catalytic activity.

These pyridine catalyst resins should exhibit sufficiently high molecular weight to be solid and insoluble in the solvent system to be used in the carbonate polymer reaction system. This determined molecular weight is dependent upon both the solvent system used and the particular type of catalyst resin system to be used.

Exemplary of the pyridine containing resins which can be used are polyvinyl pyridine prepared by the polymerization of either 3-vinyl pyridine or 4-vinyl pyridine. Such resins can be represented by the structures:

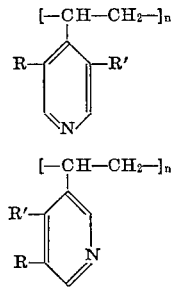

These resins are substituted by R and R' as indicated which are hydrogen or lower alkyl groups. Hydrogen substituents are preferred as greater catalytic activity is provided. In these formulae $n$ is a whole number sufficiently high that the resin is a solid insoluble polymer. Generally $n$ has a value of at least 80 but preferably in excess of this value.

Other types of pyridine containing polymers include those prepared from 4-hydroxypyridine and formaldehyde either alone or in the presence of a phenol. Such reactions produce typical phenolic resin condensation products. Preferably these condensation resins are the novolak type prepared in the presence of an acid and less then an equivalent amount of formaldehyde.

Other types of pyridine moiety containing resins are those prepared by polymerizing monomers of the formula:

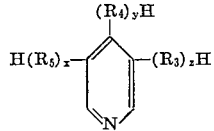

wherein $R_3$, $R_4$ and $R_5$ are radicals of the formula:

$$-CH=CH_2-R_6$$

wherein $R_6$ is an alkylene group of from zero to six carbon atoms inclusive; and $x$, $y$ and $z$ are integers having a value of from 0 to 1 inclusive such that the sum of $a$, $b$ and $c$ is a whole integer having a value of from one to three inclusive.

Illustrative of substituents $-R_3H$, $-R_4H$ and $-R_5H$ are vinyl ($-CH=CH_2$) propenyl ($-CH=CH-CH_3$), butenyl ($-CH=CH-CH_2CH_3$),

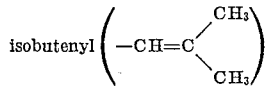

3,3-dimethyl-1-butenyl,

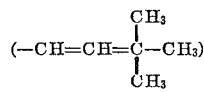

octenyl ($-CH=CH-(CH_2)_5-CH_3$), and the like.

In such instances $R_6$ is an alkylene group having from one to 6 carbom atoms inclusive such as methylene, ethylene, propylene, butylene, tetramethylene, pentamethylene, hexylene and the like.

It will be appreciated that when the sum of $x$, $y$ and $z$ is one the resultant resin is a linear thermoplastic polymer. When however the sum of these integers is greater than one than the resin will be a cross-linked or thermoset resin.

Another class of pyridine moiety containing resin useful in the conduct of the process of the present invention is the polymerized monomer illustrated by the formula:

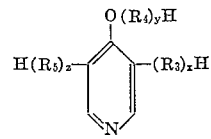

wherein $R_3$, $R_4$ and $R_5$, and $x$, $y$ and $z$ have been previously defined.

Similarly polyvinyl ether groups may be substituted for the vinyl groups represented by $R_3$ and $R_4$ in the foregoing formula.

Acrylic esters or similar unsaturated polymerizable acids can be reacted with hydroxypyridine or polyhydroxypyridine wherein the substituted hydroxyl group is located in the 3, 4 or 5 position, to provide monomers which can be polymerized to form the catalytic resins of this invention. These ester resins however do tend to lose their activity through hydrolysis and for this reason they are not preferred.

In the polymerization of carbonate polymers the poly(vinyl pyridine) catalysts are preferred as these resins produce an exceptionally high degree of catalytic activity.

The poly(vinyl pyridine) catalyst resins preferably have molecular weights in excess of 10,000.

In the conduct of the process of this invention, one or more diol reactants are charged to a reaction vessel. The pyridine containing resin catalyst preferably in a finely divided state is then conveniently added. A suitable solvent is then charged to the chamber. Then either chloroformate reactant is charged to the reaction mixture or the phosgene reactant is charged by bubbling this reactant through the reaction mixture and heating to the reaction temperature.

Other pyridine analog moieties can be present in the catalytic resins of this moiety, such analogs including: isoquinoline, pyrimidine and the like.

It will be appreciated that vinyl or poly(vinyl) substituted moieties of the above pyridine analogs provide monomers substituted in the same manner as described above for the pyridine monomers and similarly be polymerized to provide resins which serve as effective phosgenation catalysts. These catalytic resins must similarly provide a sterically unhindered heterocyclic nitrogen atom.

It will be noted that while the linear or thermoplastic polymers are generally preferred in the conduct of this invention the thermoset or cross-linked catalytic resins of this invention are generally less soluble in the solvents used in the solution carbonate polymerization. For this reason the cross-linked polymers can be desired in certain solvent systems.

The preparation of the catalysts of this invention are by those processes well known and appreciated in the art. For example the vinyl substituted pyridines and poly(vinyl) substituted pyridines are polymerized by the same methods that are used to polymerize vinylpyridine and other such similar vinyl compounds.

Those catalyst resins produced through the condensation of an aldehyde such as formaldehyde with a 4-hydroxy substituted pyridine are prepared in the same manner as phenolic resins are prepared. Similarly "novolak" and "resole" pyridine catalyst resins can be produced in the same manner as the novolak and resole are prepared.

As is known in the art it is desirable to shield the reaction from oxygen and water contamination. This is conveniently provided by purging the system with dry nitrogen gas or similar expedient and thereafter shielding the reaction from atmospheric contamination.

Suitable solvents for use in this reaction are those solvents or diluents which are inert in respect to the reactants and products under the conditions established for the reaction. Such solvents or diluents serve as a reaction medium and should be a solvent in respect to the reactants and carbonate polymer product but non-solvent in respect to the pyridine containing resin catalyst. Illustrative of such solvents are methylene chloride, ethylene dichloride, chloroform, xylene, toluene, chlorobenzene, benzene, s-tetrachloroethane, chlorinated aliphatic hydrocarbons, dioxane and the like.

As indicated above the pyridine containing resin catalyst should desirably be in a finely divided state. This desirability is predicated on the fact that a large surface area of catalyst resin is desired. However, since it is also desirable to readily recover the catalyst resin by filtration or similar means, it is not desirable to use such finely divided particles of resin that they are only recovered from the reaction mixture with difficulty. Conveniently resin catalyst particle sizes range from 60 to 100 mesh, although large and smaller particle sizes can be used. When large particles sizes of resin catalyst are utilized it is desired to provide a sufficient excess of the resin catalyst to overcome the resultant loss of surface area.

In the carbonate polymerization process a minimum amount of catalyst should be used to bind all of the hydrochloric acid generated by the reaction. This is known as an equivalent amount. Desirably this catalyst is normally used in an amount considerably in excess of this equivalent amount. In respect to the resin catalyst of the present invention the amount used is dependent upon the amount of pyridine moiety present in the resin, the molecular weight of the polymer and the particle size of the catalyst resin. Since these factors are easily determined, the amount of specific resin catalyst to be used in a particular system is readily determined. However, a simple and practical method of determining the amount of a specific resin catalyst having a specific particle size is to determine the specific reactivity of the catalyst. This is readily accomplished by steeping a predetermined quantity of the resin in dilute hydrochloric acid, washing the resin with water and then titrating a known concentration of dilute sodium hydroxide. By utilizing this method the amount of hydrochloric receptivity of the resin is determined. The amount of resin used in the system would then be at least an amount sufficient to bind the generated hydrochloric acid of the reaction based on the amount of phosgene or chloroformate used in the reaction. It is however, desired to use an amount in excess of this amount and preferably from 1.5 to 20 times this amount as it has been found that such excesses of catalyst provide polymers exhibiting particularly useful molecular weight, i.e., reduced viscosities in chloroform at 25° C. and concentration of 0.2 gram per 100 ml. of from 0.4 to 7.5.

The temperatures used in the carbonate polymerization reaction are generally from about 25° C. to about 150° C. and desirably from 60° C. to 120° C. The precise temperature conditions utilized however depend upon such factors as the molecular weight of the polymer desired, the particular diol reactant used and whether phosgene or dichloroformate reactant is used. Such temperature, the times and periods of phosgene addition and similar conditions are well known to those skilled in the art.

The phosgene and dichloroformate are generally used in equimolar or equivalent amounts.

After the reaction has been completed the catalyst resin is removed from the reaction mixture by filtration decantation or the like, after which it can be regenerated by steeping in a dilute solution of a strong base such as sodium hydroxide and subsequently used again. The carbonate polymer is recovered by conventional means such as evaporation of solvent or flocculation in methanol and filtration. While the carbonate polymerization catalysts can be effectively used in the preparation of aromatic carbonate polymers, it is especially effective in the preparation of carbonate polymers based upon cyclobutane diols such as 2,2,4,4-tetramethyl cyclobutane diol-1,3.

Examples (I) 2,2,4,4-tetramethyl cyclobutane diol + phosgene in presence of polyvinyl pyridine
(II) Bis phenol A + phosgene in presence of polyvinyl pyridine Example I Direct phosgenation of 2,2,4,4-tetramethylcyclobutanediol-1,3 in the presence of poly(vinyl pyridine) resin.

The pyridine catalyst resin, poly (3-vinyl pyridine) is prepared to a molecular weight such that it is insoluble in toluene solvent. It is then ground to about 100 mesh particle size. One gram of this resin is steeped in excess dilute hydrochloric acid, filtered and washed thoroughly with distilled water. This resin is then placed in distilled water and dilute sodium hydroxide solution of known concentration is slowly titrated into this water-resin mixture to an indicator end point.

From this titration it is determined that the catalyst resin has a pyridine equivalent of 1.5. That is to say that 1.5 grams of catalyst resin is capable of binding the same amount of hydrochloric acid as one gram of pyridine. In the polymerization reaction this results in the use of 1.5 times as much catalyst resin as pyridine would be normally used.

A five hundred milliliter flash provided with a stirrer, both argon and phosgene inlet tubes, a reflux condenser and thermometer is effectively used as a reaction chamber. The gas inlet tubes are arranged in a manner such that the argon efflux is circulated over the surface of the liquid phase while the phosgene is introduced into the reaction mixture.

An initial charge of 18.03 grams (0.125 mole) of 2,2,4,4-tetramethylcyclobutanediol-1,3, 200 milliliters of toluene and 120 grams of poly(3-vinyl pyridine) is introduced to the reaction chamber. This initial charge is stirred and heated while dry argon gas is circulated over the surface of the reaction mixture. The temperature of the initial charge is brought to reflux and is maintained at this temperature. Within a period of six minutes after attainment of reflux, 98 percent of the stoichiometric amount of phosgene is added. The rate of phosgene addition is thereupon decreased considerably and the remaining 2 percent by weight of phosgene is continued over a period of about fifty minutes. The reaction mixture gradually thickens during this period of slow addition and is very viscous at the end of the final addition period. The phosgenation is halted and the catalyst resin is filtered from the hot solution which is then allowed to cool. The cool filtrate is filtered through diatomaceous earth, and is then coagulated with about two liters of methanol. The product 2,2,4,4-tetramethylcyclobutane-1,3 polycarbonate resin is recovered by filtration and is washed.

The recovered catalyst resin, poly(3-vinyl pyridine) is washed and regenerated by steeping in excess dilute sodium hydroxide solution. This process of washing and steeping is repeated several times after which the resin is thoroughly washed in distilled water.

In a similar manner as described above, similar results are obtained by utilizing in place of the particulate poly (3-vinyl pyridine) resin catalyst, a particulate poly (4-vinyl pyridine) resin catalyst having a pyridine equivalent of 1.64 by using approximately 131.2 grams of catalyst resin; a particulate poly(3,5-divinyl pyridine) catalyst resin having a pyridine equivalent of about 2.0 by using approximately 160 grams of catalyst resin; a particulate 4-hydroxy pyridine formaldehyde acid catalyzed condensation product resin exhibiting a pyridine equivalent of approximately 2.2 by utilizing about 176 grams of catalyst resin; or other similar pyridine moiety containing insoluble resin.

Example II

Direct phosgenation of bis phenol A in the presence of poly(4-vinyl pyridine).

In a manner similar to that described in Example I above, it is determined that 80 mesh poly(4-vinyl pyridine) catalyst resin exhibits a pyridine equivalent of 1.6. Since an equivalent amount of pyridine to be used in this reaction is 0.2 mole based on 0.1 mole of phosgene and 4 times this equivalent amount would be used then the amount of catalyst resin to be used is about 101.6 grams.

To a reaction chamber similar to that described in Example I, 22.8 grams (0.1 mole) of 2,2-bis(4-hydroxy phenyl)-propane, approximately 150 milliliters of methylene chloride and about 102 grams of the particulate poly(4-vinyl pyridine) catalyst resin described above is charged. The reaction chamber is equipped with a suitable cooling bath of ice and water and the initial charge is cooled to a temperature of about 20° C. The total phosgene reactant is about 9.9 grams. 90 to 98% of this amount of phosgene is added at a rate such that the temperature is maintained at from 20°–25° C. The remaining 2 to 10 percent of the phosgene charge is added slowly over a period of about 45 minutes during which addition the reaction temperature is allowed to rise to about 35° C.

At the completion of reaction the resin catalyst is removed from the reaction by filtration. The filtrate is then cooled to room temperature and filtered through a bed of diatomaceous earth and cooled. The bis-phenol-A carbonate polymer is recovered by coagulation with about two liters of methanol, and filtration. The catalyst resin is regenerated by placing it in a column and passing alternate streams of dilute sodium hydroxide and water through the resin, and finally distilled water.

Other pyridine moiety containing catalyst resins can be used to catalyze the above reaction by substitution for the poly(4-vinyl pyridine) resin and corresponding adjustment for the pyridine equivalent of the resin.

It should be noted that in the examples the amounts of pyridine used as a basis is determined by desired amounts in excess of the equivalent amount. This is a variable determined by the art for a particular reaction system. The catalyst resins of this invention function to the same extent as the desired amount when the pyridine equivalent adjustment is made.

Example III

Preparation of 1,4-butanediol carbonate polymer by direct phosgenation of 1,4-butane diol in the presence of a catalyst resin prepared by the condensation of 4-hydroxy pyridine on formaldehyde in the presence of an acid catalyst.

In a manner similar to that described in Example I the pyridine equivalent value of the particulate 4-hydroxy pyridine-formaldehyde novolak type catalyst resin is determined to be 1.9.

This phosgenation reaction is conducted in the manner described in Example II wherein approximately 9 grams (0.1 mole) of 1,4-butane diol is substituted for the 2,2-bis(4-hydroxyphenyl) propane; and approximately 121 grams of 4-hydroxy pyridine-formaldehyde novolak type, catalyst resin is substituted for the catalyst resin of that reaction.

The methylene dichloride and phosgene amounts remain the same as do the temperature rates and recovery steps.

Example IV

Preparation of mixed diol carbonate copolymer by direct phosgenation in the presence of a typical phenolformaldehyde acid catalyzed condensation resin wherein the phenol used was 4-hydroxy-pyridine.

The catalyst used in this reaction is the same as described in Example III above.

This polymerization reaction is conducted in an identical manner to that described in Example I.

To the reaction chamber is charged 1.44 grams (0.01 mole) of 2,2,4,4-tetramethyl cyclobutane diol-1,3, 1.44 grams (0.01 mole) of 1,4-cyclohexane dimethanol, sixty milliliters of toluene, and approximately 12 grams of catalyst resin. (Approximately 4 times the equivalent amount of pyridine is generally used in this reaction when pyridine is used or 4×0.02 mole=0.08 mole. The amount of catalyst resin is this amount times the pyridine equivalence factor (1.9).)

The reaction charge is heated to reflux and 98 percent of the stoichiometric amount of phosgene is added quickly. The remaining 2 percent phosgene is slowly added over a period of about one hour. At the end of which time the catalyst resin is recovered by filtration and the 2,2,4,4-tetramethyl cyclobutane diol-1,3—1,4-cyclohexane dimethanol carbonate copolymer is recovered by cooling and coagulation in methanol as described in Example I. The pyridine catalyst resin is also regenerated in a manner similar to that described in Example I.

It should be noted that carbonate polymers can be prepared effectively in the presence of the pyridine moiety containing catalyst resins by the reaction of a diol with a dichloroformate of a diol in a similar manner except of course phosgene is not used directly.

We claim:

1. In the preparation of carbonate polymer resin by the reaction of a diol reactant with a difunctional chloroformate reactant the improvement of conducting the reaction in the presence of a particulate insoluble solid resin containing in its structure the moeity

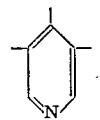

wherein said resin is present in the reaction in an amount at least sufficient to bind the acid generated by the polymerization reaction.

2. The improved process of claim 1 wherein the dichloroformate reactant is phosgene.

3. The improved process of claim 1 wherein the particulate insoluble solid catalyst resin is prepared by the polymerization of a monomer having the formula:

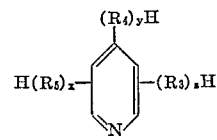

wherein $x$, $y$ and $z$ are digits having a value of from 0 to 1 inclusive such that the sum of $x$, $y$ and $z$ is equal to a whole integer of from 1 to 3 inclusive, and $R_3$, $R_4$ and $R_5$ are substituents of the formula:

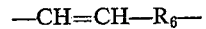

—CH=CH—$R_6$— wherein $R_6$ is an alkylene group containing from zero to six carbon atoms inclusive.

4. The improved process of claim 3 wherein the catalyst resin is poly(3-vinyl pyridine).

5. The improved process of claim 3 wherein the catalyst resin is poly(4-vinyl pyridine).

6. The improved process of claim 1 wherein the particulate solid catalyst resin is a polymerized monomer having the formula:

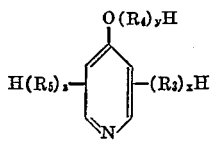

wherein $x$, $y$ and $z$ are digits having a value from 0 to 1 inclusive such that the sum of $x$, $y$ and $z$ is equal to a whole integer of from 1 to 3 inclusive, and $R_3$, $R_4$ and $R_5$ are substituents of the formula:

wherein $R_6$ is an alkylene group containing from zero to six carbon atoms inclusive.

7. The improved process of claim 1 wherein the particulate insoluble solid catalyst resin is a condensation resin of an aldehyde and 4-hydroxypyridine.

8. The improved process of claim 7 wherein the condensation resin of an aldehyde and 4-hydroxy pyridine is a novolak type resin of formaldehyde and 4-hydroxy pyridine.

9. The improved process of claim 1 wherein the diol reactant is 2,2,4,4-tetramethyl-cyclobutanediol-1,3.

10. The improved process of claim 1 wherein the diol reactant is an aryl diol.

References Cited

UNITED STATES PATENTS

| 3,143,525 | 8/1964 | Ott | 260—47 |
| 3,211,775 | 10/1965 | Stephens et al. | 260—47 |
| 3,254,051 | 5/1966 | Schmitt | 260—47 |
| 3,290,409 | 12/1966 | Munro | 260—47 |

FOREIGN PATENTS

| 925,139 | 5/1963 | Great Britain. |

SAMUEL H. BLECH, *Primary Examiner.*

U.S. Cl. X.R.

260—77.5